Dec. 12, 1933.  L. A. HARKNESS ET AL  1,939,167

SIGHT LEVEL

Filed July 10, 1930   2 Sheets-Sheet 1

INVENTORS.
Lloyd A. Harkness
Samuel L Neely
By Wm F. Davis ATTORNEY.

Dec. 12, 1933. L. A. HARKNESS ET AL 1,939,167
SIGHT LEVEL
Filed July 10, 1930 2 Sheets-Sheet 2

INVENTORS.
Lloyd A Harkness
Samuel L Neely
By Wm F Davis ATTORNEY.

Patented Dec. 12, 1933

1,939,167

UNITED STATES PATENT OFFICE 1,939,167

SIGHT LEVEL

Lloyd A. Harkness and Samuel L. Neely, Kansas City, Kans.

Application July 10, 1930. Serial No. 466,908

2 Claims. (Cl. 33—73)

The invention relates to sight levels and more particularly to an improved, dependable and inexpensive combination instrument and tool that is employed as a surveyor's transit, a sight level for leveling foundations and the like, a plumbing instrument, a square, and an angle indicator for testing the pitch of roofs, for indicating the angle of rafters in calculating the length thereof, and for laying out the ridge angle the plate step and the eve angle of rafters so they can be accurately cut before placing in the roof structure.

There are many purposes for which a dependable and inexpensive sight level or transit may be employed to great advantage, when and where it would not be financially or otherwise convenient to employ a surveyor or procure an expensive surveyor's transit, such as running lines for fences, for planting trees, locating buildings and the like where absolute accuracy is not required, but approximate accuracy is very desirable.

Laying out rafters for the ridge angle, the plate step and the eve angle are difficult operations with the tools and instruments practically attainable.

A tool and instrument that is practically dependable and inexpensive, that can be employed for a number of purposes is very desirable to the average workman as the more functions a tool will serve the less number of tools will be required, which not only saves the expense of a greater investment in tools, but also enables the mechanic to produce more work in a given time, as the time required to secure a different tool for each job is expended on the work to be performed.

The present invention has provided an improved, simple and efficient combination tool and instrument that is employed as a level, a sight level, as a transit for ordinary running of lines, as a square, for finding the pitch of roofs, for calculating and measuring the length of rafters, and as a gauge for marking the ridge angle and the plate step and eve angle of rafters.

With these and other objects in view the invention consists in the features of construction combination and arrangements of parts hereinafter set forth and more particularly pointed out in the appended claims, the drawings illustrating a proven form of the invention.

Figure 1:
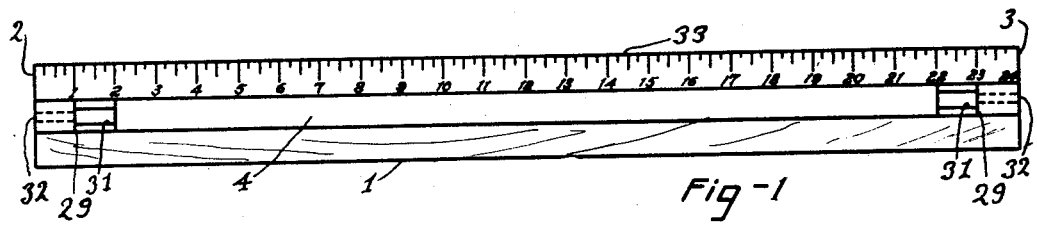
Fig. 1 is a plan view of the improved tool and instrument as ordinarily employed in leveling, and for running lines.

The stock 1, is preferably of wood, planed and dressed straight and true to a practically perfect right angled shape as shown, the ends 2 and 3 squared to a right angle to all the sides, the groove 4 cut straight and true from end to end of the stock, and has the duplicate disk shaped recesses 5 bored therein to receive the dial plates 6 and accompanying parts.

The dial plates 6 are duplicate and each provided with the annular flange 7, the conically shaped bearing 8, the slots 9 and are secured to the stock 1 by the ordinary wood screws 10, the slots allowing the dial plates to be adjusted accurately, so that when the hand 11 registers with the line 12 the base 13 of the stock 1 is level, and when the hand registers with the line 14 the base 13 of the stock is plumb.

The lines 12 and 14 are preferably impressed in the dial plate 6, as are also the rafter angle indicating lines 15, 16 and 17 and the numerals two three and four as shown. The line 15 accompanying numerals two indicate the position of the hands 11 when the base 13 of the stock 1 is at the correct angle to cut a rafter for a one half pitch roof, provided the rafter has been properly leveled, the line 16 and numerals three are for three eighths pitch, and the line 17 and numerals four are for one quarter pitch.

Within the annular flange 7 of the dial plates 6 fitting snugly and pressed into position so that it remains rigidly is the hoop shaped ring 18 with the integrally formed arm 19 provided with the conically shaped bearing 20.

The arm 19 and the rafter angle indicating numerals two, three and four are shown only in the enlarged view 4 to avoid illustrating minor details in the smaller views.

The shaft 21 is conically shaped at both ends and mounted to turn freely in the bearings 8 and 20, and has rigidly mounted thereon the hand 11 which is pointed at both ends thereof 22 and 23 and provided with the weight 24 so that the end 22 always points upwardly and the end 23 points downwardly.

Figure 3:
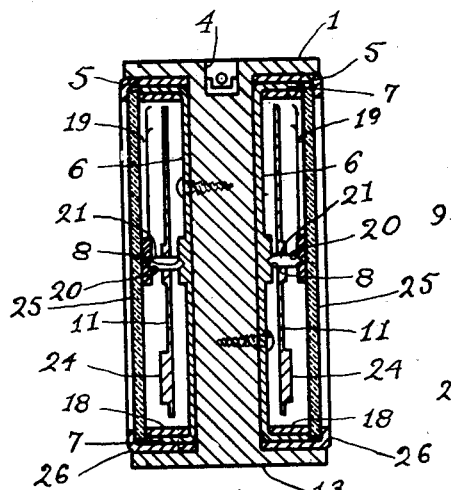
Fig. 3 is an enlarged sectional view on line 3—3 of Fig. 2.
Figure 4:
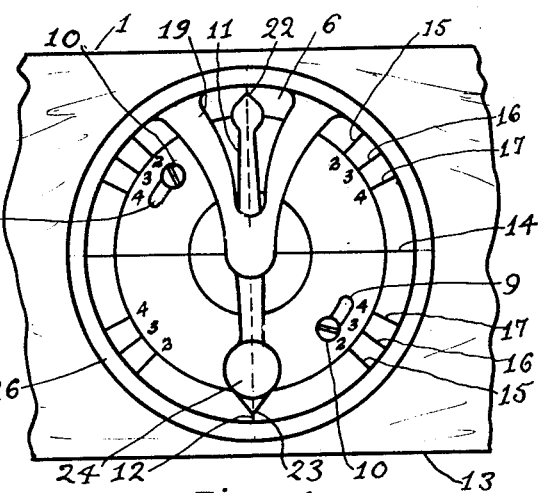
Fig. 4 is a fragmentary enlarged view in the same position as that of Fig. 2.
Figure 6:
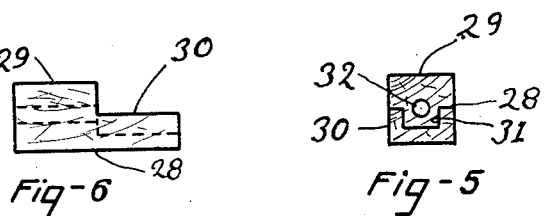
Fig. 6 is a side view of Fig. 5 and on the same scale.
Figure 5:
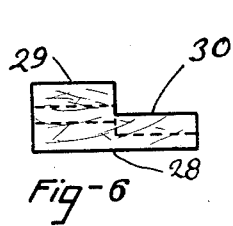
Fig. 5 is an enlarged view of the inner end of one of the sight blocks as shown in Fig. 3.

Resting against the flange 7 of the dial plates 6 and the hoop shaped ring 18 is the transparent cover plate 25 preferably of glass, which is retained in fixed position by the radially disposed integral flange 26 of the hoop shaped ring 27 fitting snugly around the annular flange 7 and pressed into position as shown in Fig. 3.

Figure 2:
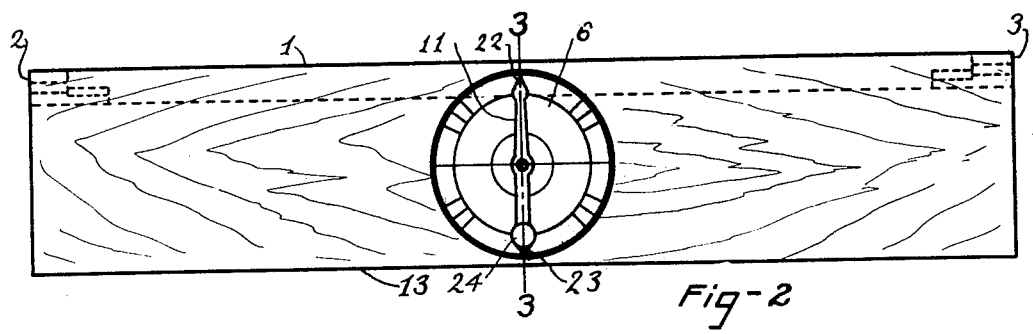
Fig. 2 is a side view in the same position.

The sight blocks 28 are duplicate and the outer end portions thereof 29 are formed to just fill snugly the groove 4, while the inner end portions 30 of the blocks fill the groove 4 to about one half the depth of the groove and are provided with the small grooves 31. The outer end portions of the blocks 29 are provided with the sight holes 32 and the blocks are rigidly mounted in the groove 4 as shown in Figs. 1, 2 and 3.

The sight holes 32 are approximately in the center of the groove 4 vertically and transversely and the groove forms a guide to assist the eye of the user in finding the object desired to sight through the holes 32. The small grooves 30 also assist in aligning the stock 1 and the holes 32 are merely employed as final sights to prove when the objects are accurately positioned.

The grooves 4 and 31 are employed to sight the usual stakes and poles while placing them in alignment, and the holes 32 to prove the final setting thereof.

Figure 7:
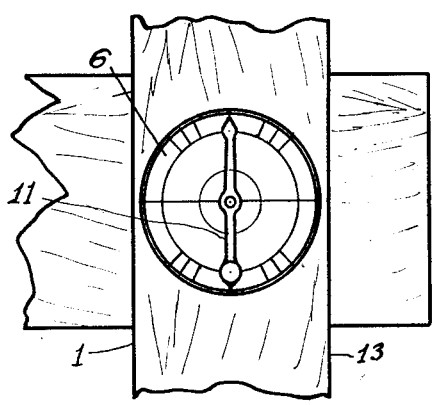
Figs. 7, 8, 9 and 10 are views on the same scale as that of Fig. 2, illustrating certain operative positions of the tool and instrument.
Figure 8:
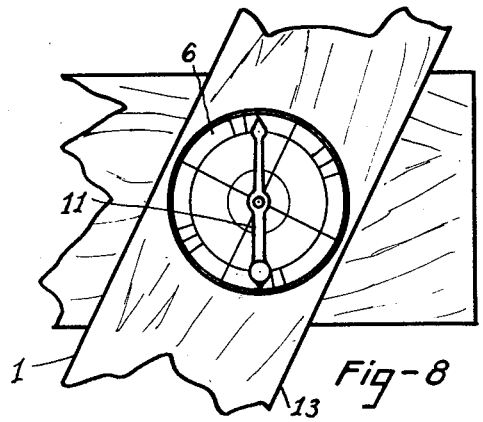
Figure 9:
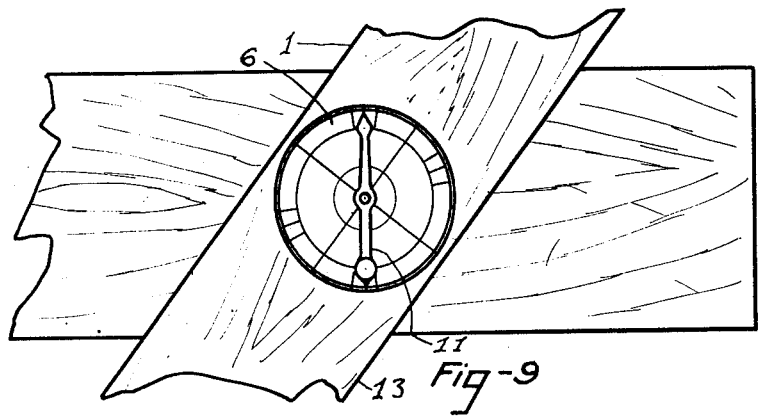
Figure 10:
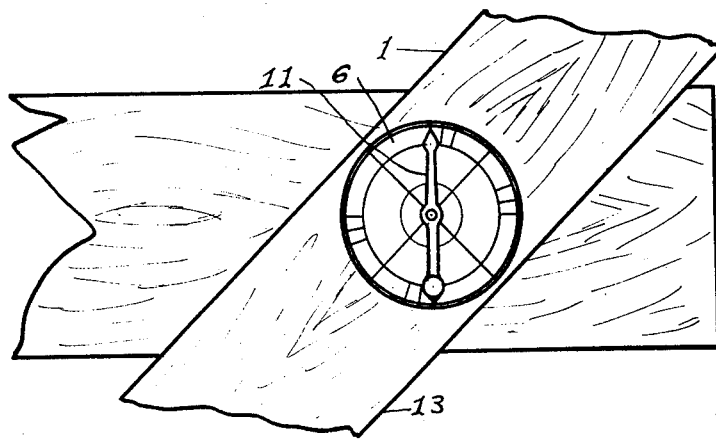

In Fig. 7 the stock 1 is shown in plumb position with the ends 22 and 23 of the hand 11 pointing to the line 12, while in Fig. 8 the stock 1 is in position to mark a rafter for a one quarter pitch roof, Fig. 9 indicates the cutting angle of a rafter for a three eighths pitch roof and Fig. 10 the angle of the rafter for a one half pitch roof.

The stock 1 may be employed as a square, and the rule 33 mounted on the upper side of the stock enables it to be employed as a rule, which is usually more convenient than securing a separate rule.

The sight level is of particular importance as a surveyor's transit for the laying out of lines, as a level, and as an accurate and rapid instrument for finding and laying out the ridge angle, the step angle and the eye angle of rafters so they can be cut accurately, and may be advantageously employed as a square and as a rule for measuring and squaring building material, measuring distances between posts and trees and the like.

Having described our invention, what we claim as new and desire to secure by Letters Patent, is:—

1. In a combination sight level, a stock provided with a longitudinally disposed outwardly opening groove reaching from end to end of the stock, and a block in each end of said groove, each of said blocks channel shaped for a portion of the length thereof beginning at the facing ends of said blocks and forming a small groove extending toward the outer ends of said stock, the remainder of the length of said blocks rising above said channel shaped portions of said blocks and each block provided with a hole the axis of which is approximately in alignment with the axis of the outwardly facing edges of said channel shapes, said channel shapes being in alignment with said first mentioned groove and said holes to guide the sight from the hole in the block nearest to the eye to the hole in the block farthest from the eye.

2. In a combination sight level, a stock provided with an elongated groove opening outwardly and reaching from near one end of the stock to near the remaining end thereof, said groove terminating and opening at each end thereof into a smaller groove extending toward the adjacent end of the stock, there being at each end of the slot a small hole opening to the outer end of the stock, said small grooves and said small holes disposed in alignment so that the small groove farthest from the eye will assist the eye in locating the hole in the farthest end of the stock from the eye when sighting through the hole nearest to the eye.

LLOYD A. HARKNESS.
SAMUEL L. NEELY.